US010036260B2

(12) United States Patent
Rapp et al.

(10) Patent No.: US 10,036,260 B2
(45) Date of Patent: Jul. 31, 2018

(54) DAMPER MASS DISTRIBUTION TO PREVENT DAMPER ROTATION

(71) Applicant: UNITED TECHNOLOGIES CORPORATION, Hartford, CT (US)

(72) Inventors: Brandon M. Rapp, West Hartford, CT (US); Matthew Andrew Hough, West Hartford, CT (US)

(73) Assignee: United Technologies Corporation, Farmington, CT (US)

(*) Notice: Subject to any disclaimer, the term of this patent is extended or adjusted under 35 U.S.C. 154(b) by 365 days.

(21) Appl. No.: 14/765,852

(22) PCT Filed: Mar. 7, 2014

(86) PCT No.: PCT/US2014/021521
§ 371 (c)(1),
(2) Date: Aug. 5, 2015

(87) PCT Pub. No.: WO2014/164252
PCT Pub. Date: Oct. 9, 2014

(65) Prior Publication Data
US 2015/0369057 A1 Dec. 24, 2015

Related U.S. Application Data

(60) Provisional application No. 61/778,753, filed on Mar. 13, 2013.

(51) Int. Cl.
F01D 5/26 (2006.01)
F01D 5/22 (2006.01)
(Continued)

(52) U.S. Cl.
CPC .............. *F01D 5/26* (2013.01); *F01D 5/02* (2013.01); *F01D 5/12* (2013.01); *F01D 5/22* (2013.01);
(Continued)

(58) Field of Classification Search
CPC ..... F01D 5/26; F01D 5/02; F01D 5/12; F01D 5/3007; F01D 5/326; F01D 11/006;
(Continued)

(56) References Cited

U.S. PATENT DOCUMENTS 5,228,835 A 7/1993 Chlus
5,803,710 A * 9/1998 Dietrich .................. F01D 5/22
416/248
(Continued)

FOREIGN PATENT DOCUMENTS

EP 0851096 A2 7/1998

OTHER PUBLICATIONS

Supplementary European Search Report for European Application No. 14779530.6 completed Oct. 21, 2016.
(Continued)

*Primary Examiner* — Mark Laurenzi
*Assistant Examiner* — Shafiq Mian
(74) *Attorney, Agent, or Firm* — Carlson, Gaskey & Olds, P.C.

(57) ABSTRACT

A damper seal for a gas turbine engine rotor assembly has an axially elongated body with a leading edge, a trailing edge, a pressure side, and a suction side. The elongated body includes a first enlarged portion formed on the pressure side at the leading edge and a second enlarged portion formed on the suction side adjacent the trailing edge.

20 Claims, 8 Drawing Sheets

(51) Int. Cl.
*F01D 11/00* (2006.01)
*F01D 5/02* (2006.01)
*F01D 5/12* (2006.01)
*F01D 5/30* (2006.01)
*F01D 5/32* (2006.01)

(52) U.S. Cl.
CPC ........... *F01D 5/3007* (2013.01); *F01D 5/326* (2013.01); *F01D 11/006* (2013.01); *F05D 2220/32* (2013.01); *F05D 2240/55* (2013.01); *F05D 2250/71* (2013.01); *F05D 2250/73* (2013.01); *F05D 2260/96* (2013.01)

(58) Field of Classification Search
CPC ........ F01D 11/00; F01D 5/22; F05D 2220/32; F05D 2240/55
See application file for complete search history.

(56) References Cited

U.S. PATENT DOCUMENTS

| | | | | |
|---|---|---|---|---|
| 5,827,047 A * | 10/1998 | Gonsor | ...................... | F01D 5/22 416/193 A |
| 5,924,699 A * | 7/1999 | Airey | ..................... | F01D 11/008 277/411 |
| 6,171,058 B1 | 1/2001 | Stec | | |
| 6,837,686 B2 * | 1/2005 | Di Paola | ................. | F01D 5/323 416/220 R |
| 7,121,802 B2 * | 10/2006 | Athans | ...................... | F01D 5/22 416/193 A |
| 7,367,123 B2 * | 5/2008 | Itzel | ......................... | F01D 5/22 29/889.2 |
| 7,467,924 B2 * | 12/2008 | Charbonneau | ............ | F01D 5/22 416/193 A |
| 7,507,075 B2 * | 3/2009 | Kang | ..................... | F01D 5/147 416/248 |
| 7,625,174 B2 * | 12/2009 | Drerup | .................... | F01D 9/041 415/135 |
| 7,628,588 B2 * | 12/2009 | Itzel | ......................... | F01D 5/22 415/119 |
| 8,876,478 B2 * | 11/2014 | Wassynger | ................ | F01D 5/24 415/119 |
| 9,587,495 B2 * | 3/2017 | Beattie | ...................... | F01D 5/22 |
| 2006/0056974 A1 * | 3/2006 | Beattie | ...................... | F01D 5/10 416/193 A |
| 2008/0206054 A1 | 8/2008 | Holmes | | |
| 2009/0004013 A1 * | 1/2009 | Ramlogan | ................. | F01D 5/22 416/190 |
| 2010/0098547 A1 * | 4/2010 | Hagan | ................... | F01D 5/3007 416/219 R |
| 2010/0111700 A1 * | 5/2010 | Kim | ......................... | F01D 5/22 416/219 R |
| 2011/0014050 A1 | 1/2011 | Lake et al. | | |

OTHER PUBLICATIONS

International Preliminary Report on Patentability for International Application No. PCT/US2014/021521 dated Sep. 24, 2015.
International Search Report from counterpart PCT/US2014/021521, filed Mar. 7, 2014.

* cited by examiner

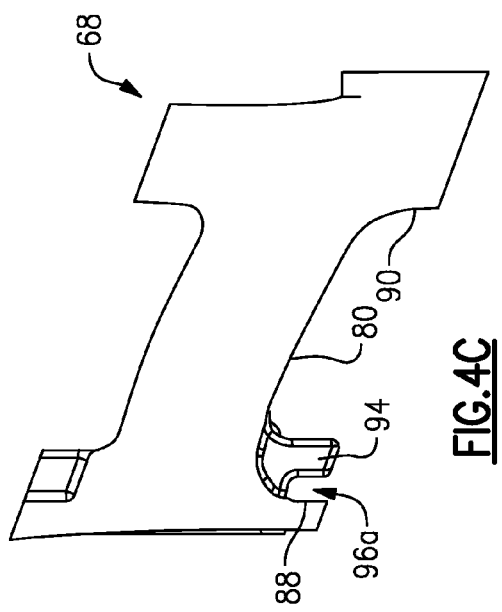
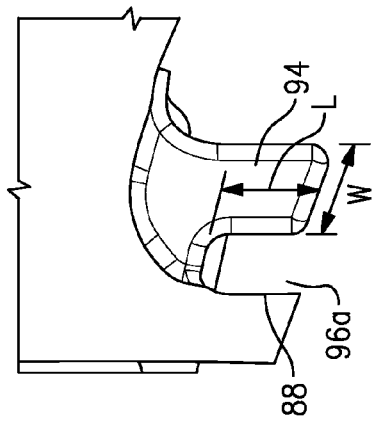
FIG.4C
FIG.4D
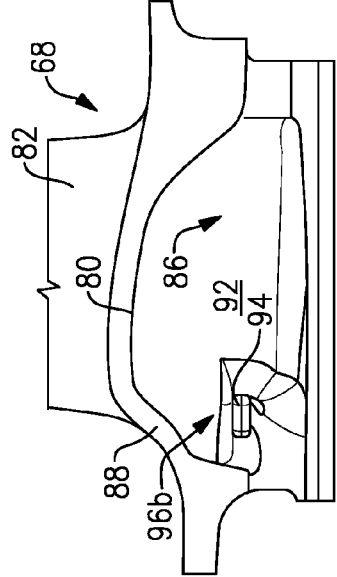
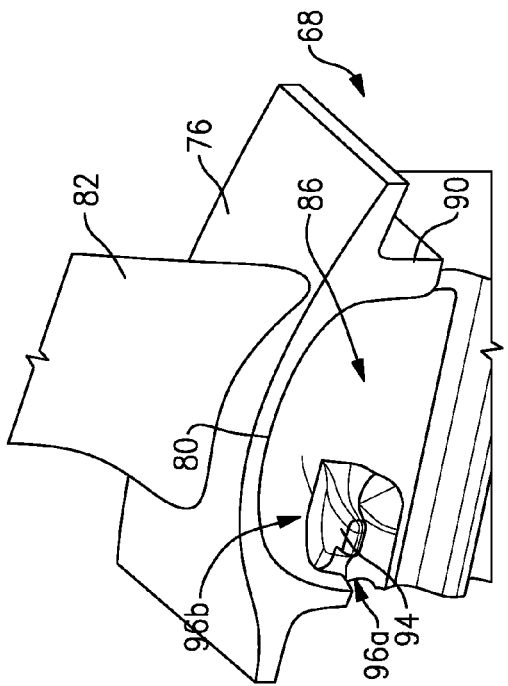
FIG.4A
FIG.4B

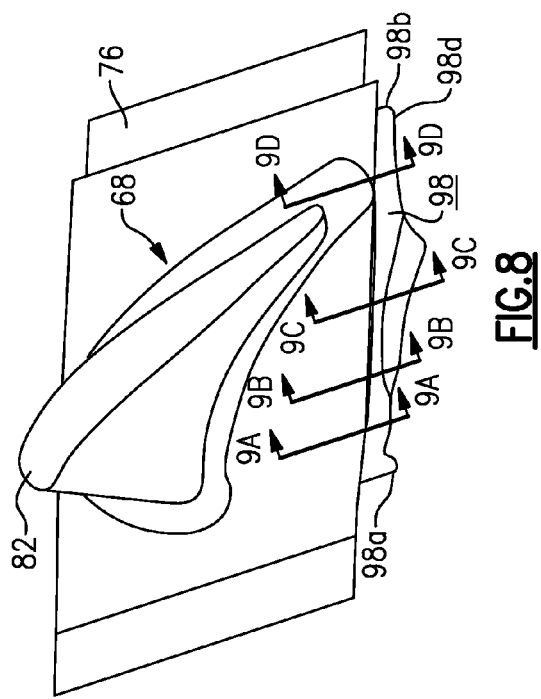
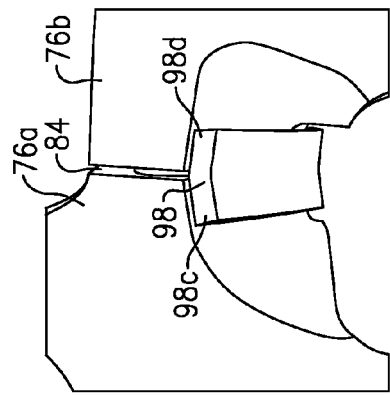
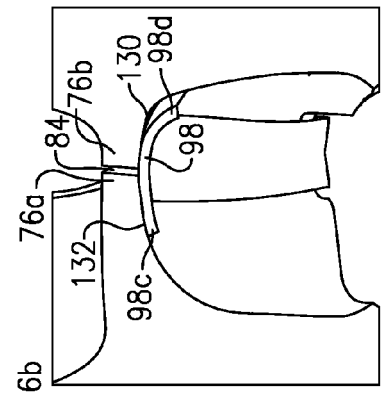
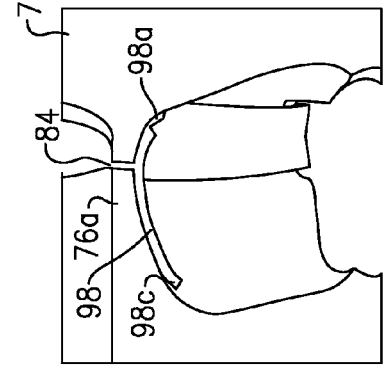
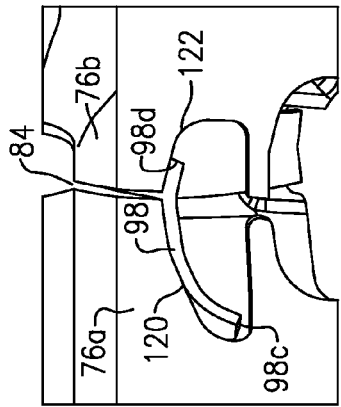

DAMPER MASS DISTRIBUTION TO PREVENT DAMPER ROTATION

CROSS-REFERENCE TO RELATED APPLICATION

This application claims priority to U.S. Provisional Application No. 61/778,753, filed Mar. 13, 2013.

BACKGROUND

Conventional gas turbine engines include a turbine assembly that has a plurality of turbine blades attached about a circumference of a turbine rotor. Each of the turbine blades is spaced a distance apart from adjacent turbine blades to accommodate movement and expansion during operation. Each blade includes a root that attaches to the rotor, a platform, and an airfoil that extends radially outwardly from the platform.

A seal and damper assembly is installed between adjacent blades. The seal and damper assembly prevents hot gases flowing over the platform from leaking between adjacent turbine blades as components below the platform are generally not designed to operate for extended durations at the elevated temperatures of the hot gases. The seal and damper assembly also dissipates potentially damaging vibrations.

The seal and damper assembly is typically positioned in a cavity between adjacent turbine blades on an inner surface of the platforms. Typically, the seal and damper assembly is disposed against a radially outboard inner surface of the platform of the turbine blade and is retained in place by a small nub formed on the inner surface of the platform. The cavity also typically includes shelves to radially retain ends of the seal and damper assembly.

While the shelf and nub configurations serve to retain the seal and damper assembly, during assembly and engine operation the seal and damper assembly is not always fully constrained from movement with the cavity. In certain situations the seal and damper can disengage from the shelf and fall into the disk, which requires the rotor to be taken apart and rebuilt. Also, during engine operation the nub does not prevent tangential movement of the seal and damper within the cavity. Some seal and damper assemblies have shown large distortions from nominal shape, which is caused by high platform temperatures and lack of seal and damper retention in the cavity.

Accordingly, it is desirable to provide a seal and damper which is easily installed and which is restricted from moving within a pocket formed between adjacent high pressure turbine blade platforms.

SUMMARY

In a featured embodiment, a damper seal for a gas turbine engine rotor assembly has an axially elongated body with a leading edge, a trailing edge, a pressure side, and a suction side. The elongated body includes a first enlarged portion formed on the pressure side at the leading edge and a second enlarged portion formed on the suction side adjacent the trailing edge.

In another embodiment according to the previous embodiment, the elongated body is defined by a length and a width that continuously varies between the leading edge and trailing edge. The width is at a maximum at the first enlarged portion.

In another embodiment according to any of the previous embodiments, the first and second enlarged portions comprise increased mass portions relative to a remaining portion of the elongated body.

In another embodiment according to any of the previous embodiments, the first enlarged portion has a greater mass than the second enlarged portion.

In another embodiment according to any of the previous embodiments, the elongated body includes a tab that extends axially outward from the leading edge.

In another embodiment according to any of the previous embodiments, the tab defines a minimum width for the elongated body.

In another featured embodiment, a disk and blade assembly for a gas turbine engine has a disk defining an axis of rotation. A plurality of blades is mounted to the disk for rotation with the disk about the axis of rotation. Each of the blades include an airfoil extending from a leading edge to a trailing edge and a platform having an inner surface and an outer surface. Adjacent platforms define a pocket having a pressure side and a suction side that extend from the leading edge to the trailing edge. A damper seal is mounted within the pocket such that a distribution of damper mass between the pressure side and suction side of the pocket is varied along an axial length of the damper seal.

In another embodiment according to the previous embodiment, the damper seal comprises an axially elongated body having a leading edge, a trailing edge, a pressure side, and a suction side. The elongated body includes a first section portion that is generally radially aligned with the leading edge of the blade. A majority of the first section portion is positioned within the pressure side of the pocket.

In another embodiment according to any of the previous embodiments, 51% to 80% of the first section portion is positioned within the pressure side of the pocket.

In another embodiment according to any of the previous embodiments, the elongated body includes a second section portion that is generally radially aligned with the trailing edge of the blade. The second section portion has generally equal amounts within the pressure and suction sides of the pocket.

In another embodiment according to any of the previous embodiments, the elongated body includes a third section portion that is generally radially aligned with a portion of the blade that is closer to the trailing edge than the leading edge, and wherein a majority of the third section portion is positioned within the suction side of the pocket.

In another embodiment according to any of the previous embodiments, the elongated body includes a third section portion that is generally radially aligned with a portion of the blade that is closer to the trailing edge than the leading edge. A majority of the third section portion is positioned within the suction side of the pocket.

In another embodiment according to any of the previous embodiments, the elongated body includes a first enlarged portion formed on the pressure side at the leading edge and a second enlarged portion formed on the suction side adjacent the trailing edge. The first enlarged portion defines a maximum width of the elongated body.

In another embodiment according to any of the previous embodiments, the elongated body includes a tab that extends axially outward from the leading edge.

In another embodiment according to any of the previous embodiments, the tab defines a minimum width for the elongated body.

In another embodiment according to any of the previous embodiments, the pocket has a radially outer wall, a pressure side wall, and a suction side wall. The pocket includes a leading edge wall portion and a trailing edge wall portion, and includes a shelf extending in a tangential direction from the pressure side of the pocket. The shelf is positioned adjacent the leading edge wall portion and spaced apart from the radially outer wall. The damper seal is supported by the shelf.

In another embodiment according to any of the previous embodiments, the first enlarged portion has an overlapping relationship with the shelf.

In another embodiment according to any of the previous embodiments, the shelf has a first shelf and includes a second shelf extending axially inward from the leading edge wall portion on the suction side of the pocket. The first and second shelves are configured to restrict radial, axial, and tangential movement of the damper seal within the pocket.

In another embodiment according to any of the previous embodiments, the tab is visible from a leading edge end face of the disk when assembled within the pocket.

In another embodiment according to any of the previous embodiments, the shelf is spaced from the leading edge wall portion by a gap. The leading edge of the elongated body is positioned within the gap.

BRIEF DESCRIPTION OF THE DRAWINGS

The disclosure can be further understood by reference to the following detailed description when considered in connection with the accompanying drawings wherein:

FIG. 4A is a side view of a pressure side pocket side of a blade.

FIG. 4B is a perspective view of the blade of FIG. 4A as viewed from a trailing edge location.

FIG. 4C is bottom view of FIG. 4A.

FIG. 4D is an enlarged view of FIG. 4C.

FIG. 8 is a top view of a blade and damper seal.

FIG. 9A is a cross-sectional view taken along 9A-9A of FIG. 8.

FIG. 9B is a cross-sectional view taken along 9B-9B of FIG. 8.

FIG. 9C is a cross-sectional view taken along 9C-9C of FIG. 8.

FIG. 9D is a cross-sectional view taken along 9D-9D of FIG. 8.

DETAILED DESCRIPTION

Figure 1:
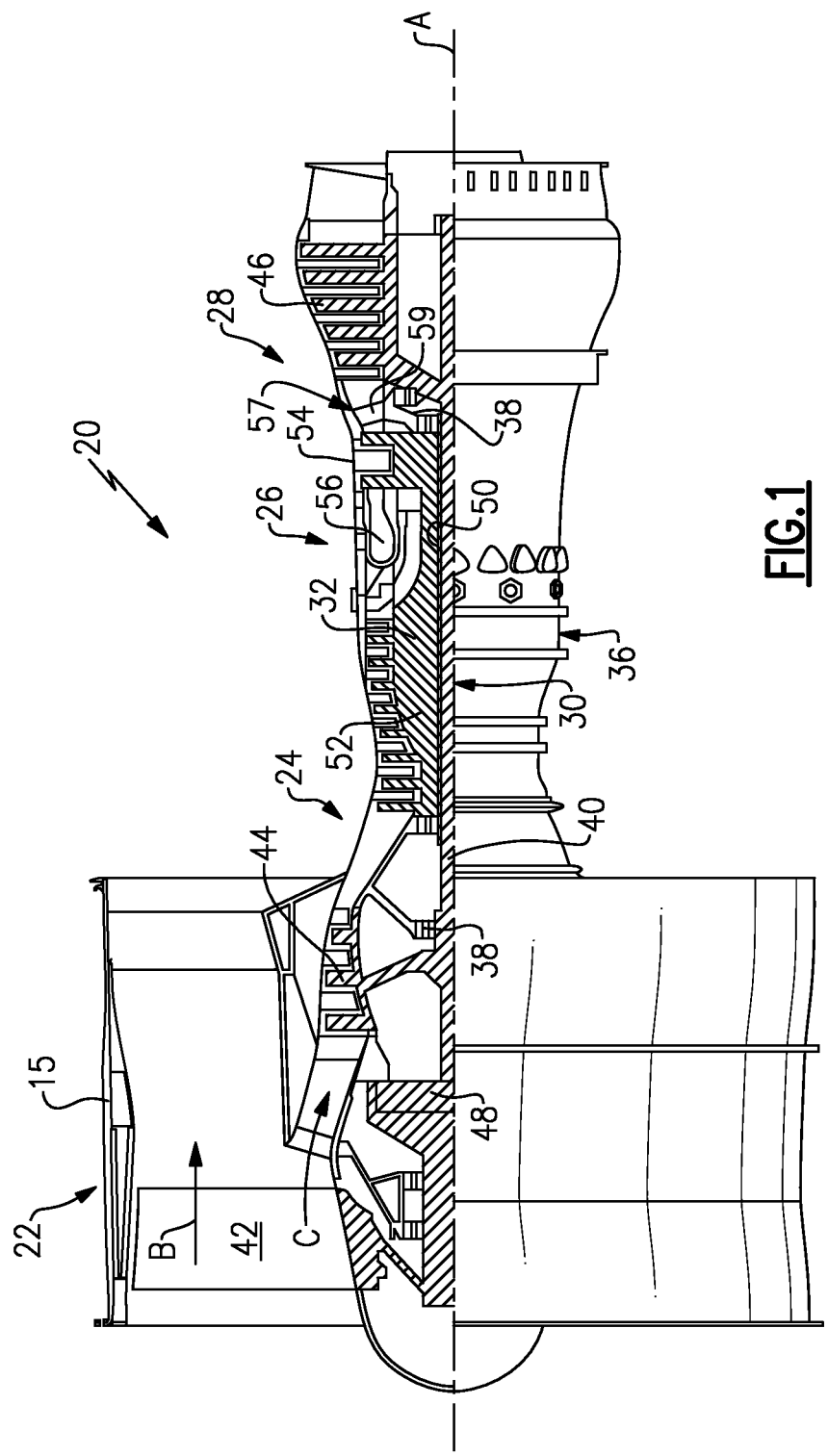
FIG. 1 schematically illustrates a geared turbofan engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7\ °R)]^{0.5}$. The "Low corrected fan tip speed", as disclosed herein according to one non-limiting embodiment, is less than about 1150 ft/second.

Figure 2:
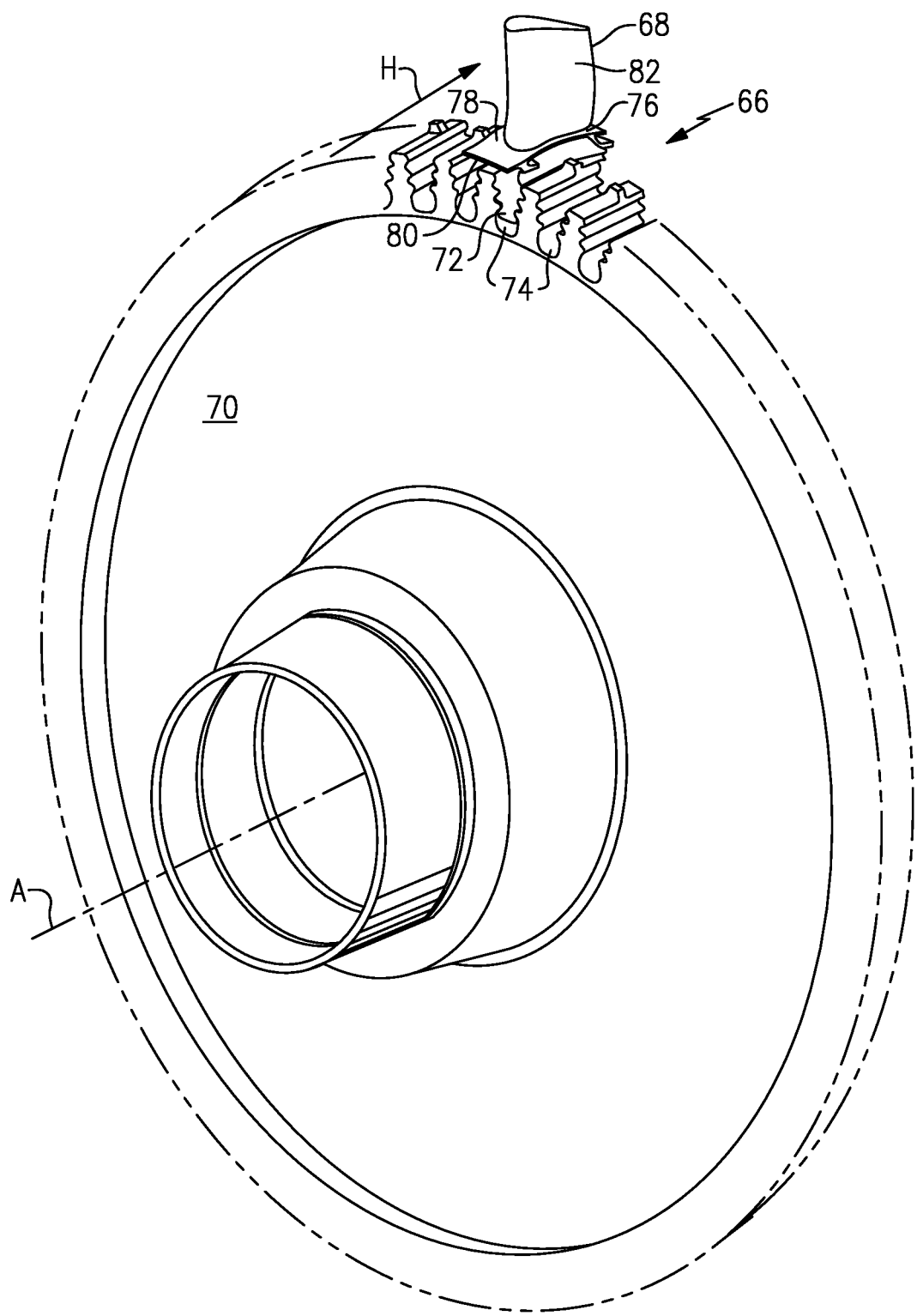
FIG. 2 illustrates a front perspective view of a blade mounted to a turbine disk.

The turbine section 28 includes one or more turbine rotor assemblies 66 as shown in FIG. 2. Each rotor assembly 66 includes a plurality of adjacent turbine blades 68 (only one is shown in FIG. 2) mounted to a turbine rotor disk 70 for rotation about the engine axis A. Each of the turbine blades 68 includes a root 72 that is fit into a corresponding slot 74 of the turbine rotor disk 70. Radially outward of the root 72 is a platform 76. The platform 76 defines an outer platform surface 78 and an inner platform surface 80. The inner platform surface 80 is disposed radially inward of the outer platform surface 78. An airfoil 82 extends outward from the platform 76.

Figure 3:
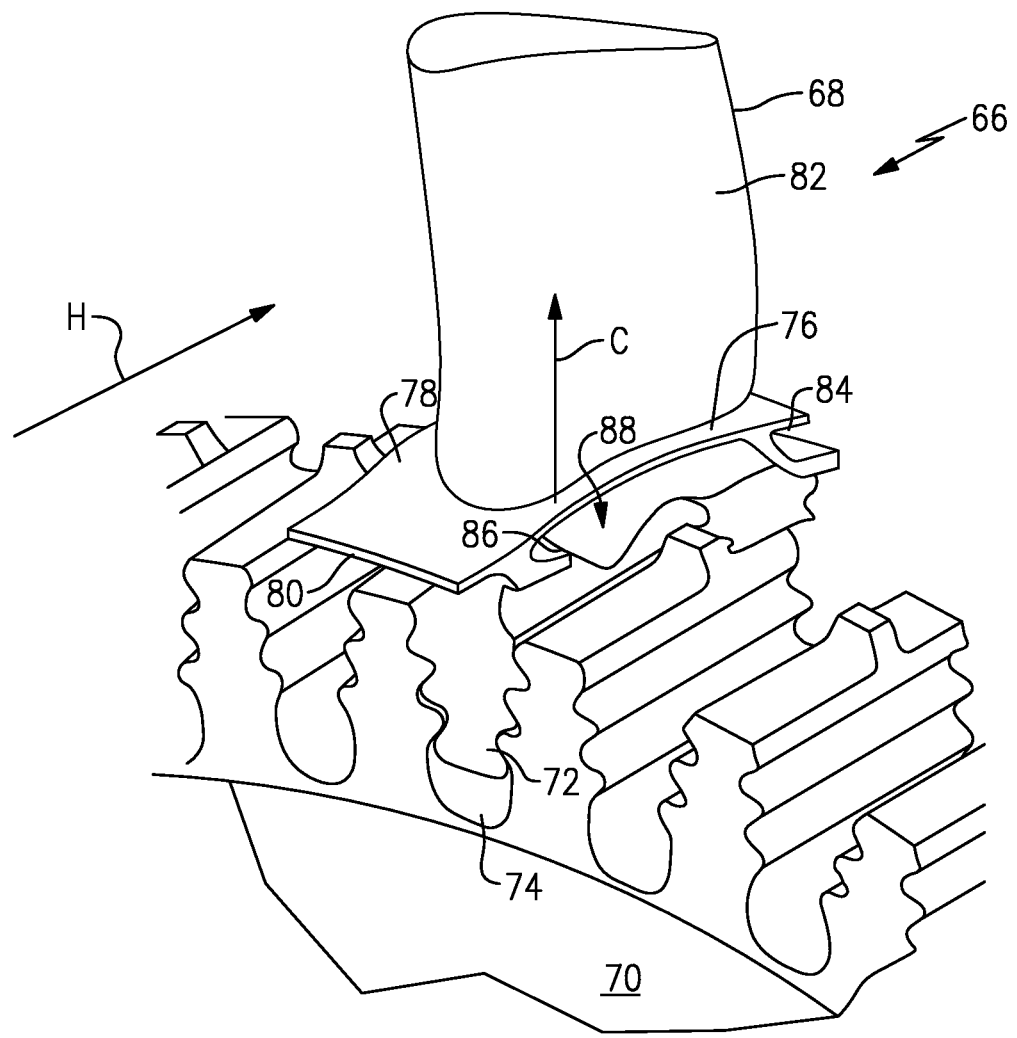
FIG. 3 is a perspective view of a portion of the turbine disk and blade of FIG. 2 which schematically shows a damper.

As shown in FIG. 3, a gap 84 extends axially between adjacent turbine blades 68. Hot gas H flows around the airfoil 82 and over the outer platform surface 78 while relatively cooler high pressure air (C) pressurizes a cavity or pocket 86 under the platform 76. The gap 84 between adjacent blades prevents contact and allows for thermal growth between adjacent turbine blades 68.

As shown in FIG. 4A, the pocket 86 has a radially outer wall portion defined by the inner platform surface 80, a leading edge wall portion 88, a trailing edge wall portion 90, and a pressure side wall portion 92 as viewed in FIG. 4A.

A shelf 94 extends outwardly from the pressure side wall portion 92 in a tangential direction relative to axis A. The shelf 94 is spaced from the leading edge wall portion 88 by a gap 96a as shown in FIG. 4C and is spaced apart from the radially outer wall portion 80 by a gap 96b as shown in FIG. 4A. The shelf 94 is defined by an axially extending width W and a tangentially extending length L as shown in FIG. 4D. In one example the length L is greater than the width W. The shelf 94 assists in assembly, axially and radially retains a damper seal 98 (FIG. 6), and prevents rotation of the damper seal 98 into the pressure side neck. This will be discussed in greater detail below.

Figure 5:
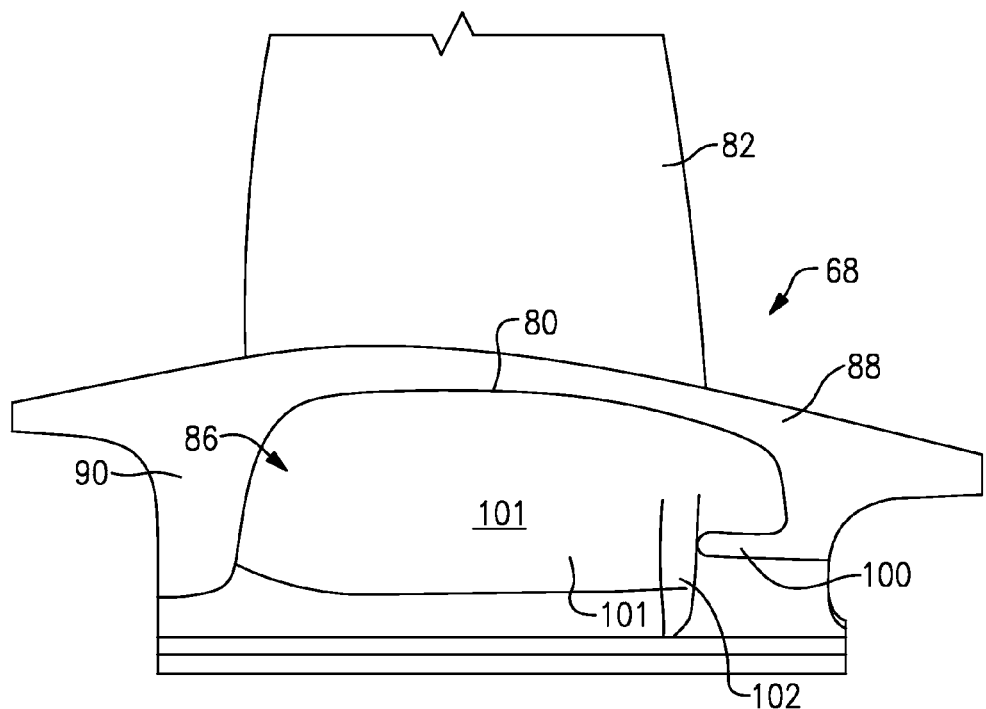
FIG. 5 is side view of a suction side pocket of a blade.

As shown in FIG. 5, a leading edge shelf 100 extends in an axial direction from the leading edge wall portion 88 of a suction side 101 of the pocket 86. The leading edge shelf 100 extends axially inwardly into the pocket 86 such that a distal end 102 of the shelf is in overlapping engagement with the leading edge of the airfoil 82 in a radial direction. This suction side leading edge damper shelf 100 prevents the damper seal 98 from disengaging the shelf axially during assembly and operation.

Figure 6A:
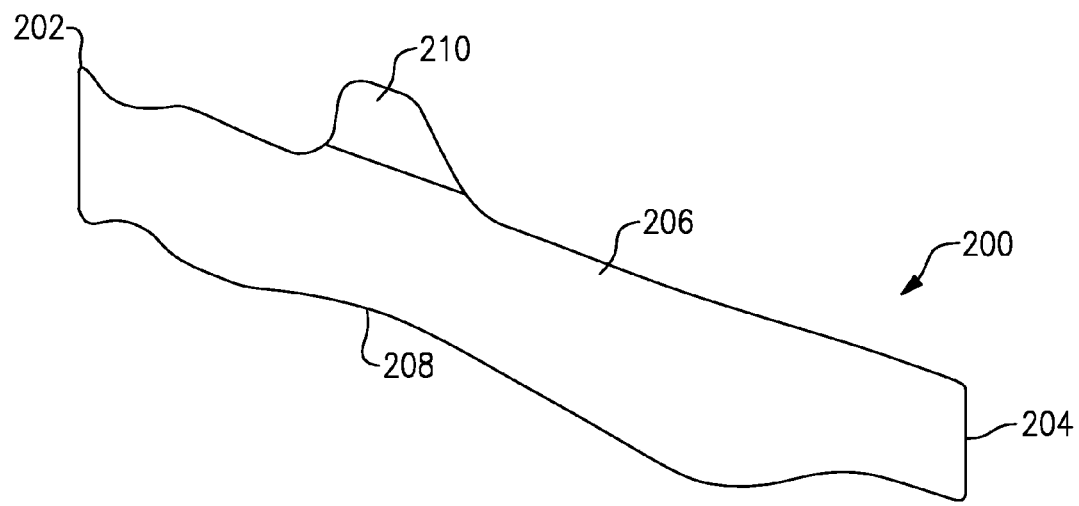
FIG. 6A is a perspective view of a prior art damper seal.

A prior damper seal 200 is shown in FIG. 6A. The damper seal 200 includes a leading edge 202, a trailing edge 204, a pressure side 206, and a suction side 208. A tab portion 210 extends outwardly from the pressure side 206 of the damper seal 200. The purpose of the tab portion 210 was to facilitate assembly, but was not always effective. Further, this damper seal configuration exhibited tangential movement within the pocket during engine operation, which led to permanent distortion of the shape of the damper seal from its initial shape.

Figure 6B:
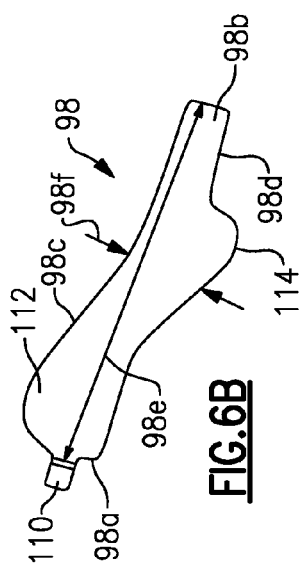
FIG. 6B is a perspective view of a damper seal incorporating the subject invention.

The subject damper seal 98 is shown in greater detail in FIG. 6B. The damper seal 98 is sized to provide sufficient mass and rigidity to dissipate vibrations from the turbine blade. In the example shown, the damper seal 98 has an axially elongated body having a leading edge 98a, a trailing edge 98b, a pressure side 98c, and a suction side 98d. The damper seal 98 is defined by a length 98e and a width 98f. The width 98f varies between the leading edge 98a and trailing edge 98b. The width 98f is greater at the leading edge end than the trailing edge end of the damper seal.

In the example shown, a leading edge tab 110 extends axially outward from the leading edge 98a. The tab 110 defines the minimum width of the elongated body. The tab 110 facilitates assembly and aids in the correct positioning of the damper seal within the pocket 86.

In the example shown, a first enlarged portion 112 is provided on the pressure side 98c adjacent the leading edge 98a. A second enlarged portion 114 is provided on the suction side 98d adjacent the trailing edge 98b. These enlarged portions 112, 114 add mass at these locations as compared to prior designs. The first enlarged portion 112 has a greater mass than the second enlarged portion 114. Further, the width at the first enlarged portion 112 defines the maximum width of the elongated body. The added mass decreases freedom of movement of the damper seal in the pocket during engine operation. This will be discussed in greater detail below.

Figure 7B:
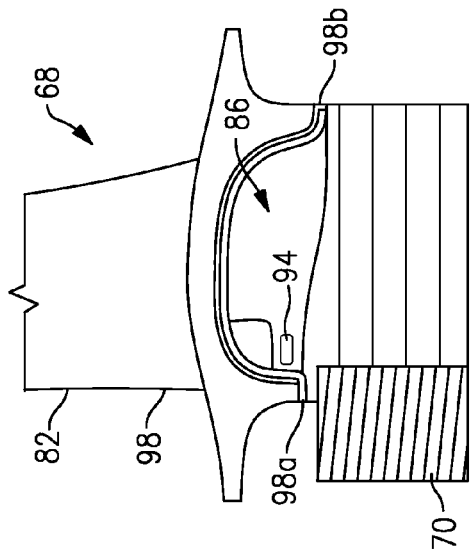
FIG. 7B shows a side view of a partially installed blade and a fully installed damper seal.
Figure 7C:
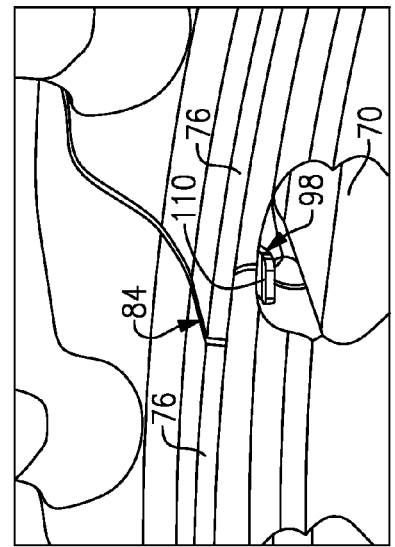
FIG. 7C is a leading edge end view showing a correctly installed damper seal.
Figure 7A:
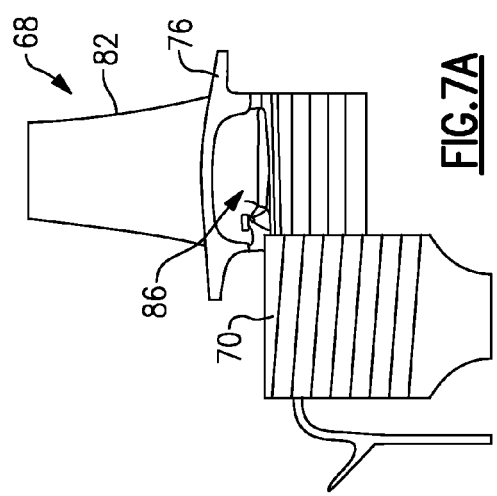
FIG. 7A is a side view of assembling a blade to a disk.

The method of assembly for the damper seal 98 is shown in FIGS. 7A-7E. In a first step, a blade 68 is partially installed within the disk 70 from the rear as shown in FIG. 7A. In one example, the blade 68 is engaged approximately 0.125 inches (3.175 mm) in the disk 70. Next, the damper seal 98 is inserted into a corresponding pocket 86 as shown in FIG. 7B. It is important to ensure that the damper seal is correctly engaged in the leading edge pocket portion as shown in FIG. 7B. This process is then repeated for each blade 68.

Once all of the blades 68 are partially installed in the disk 70, the blades are all simultaneously seated as a unit against a minidisk (not shown). Next, a visual inspection is performed to ensure that the damper seals are correctly engaged in the leading edge pocket portions. As shown in FIG. 7C, when the damper seal 98 is installed correctly, the leading edge tab 110 is visible from an end view of the blade and disk assembly. If the damper seal is not properly installed at the leading edge, i.e. the leading edge tab 110 is not properly positioned within the leading edge pocket portion, the damper seal will not fit properly and the blade will not be able to fully engage the disk without the damper seal protruding from the trailing edge. The visual inspection is performed for each damper seal 98. The next step performed is to verify that the trailing edge 98*b* of each damper seal 98 is flush or below an aft face of the blades and disk 70.

Figure 7D:
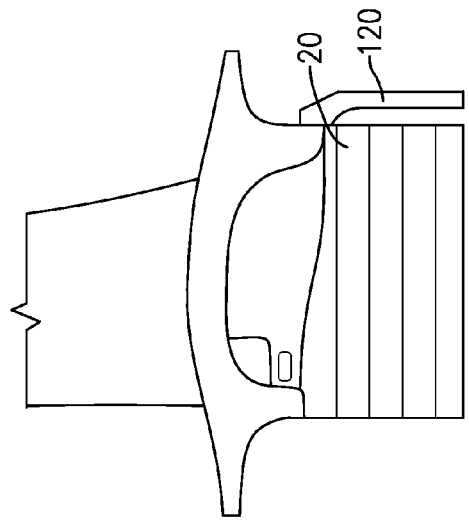
FIG. 7D is a side view showing a fully installed blade, damper seal and cover plate.
Figure 7E:
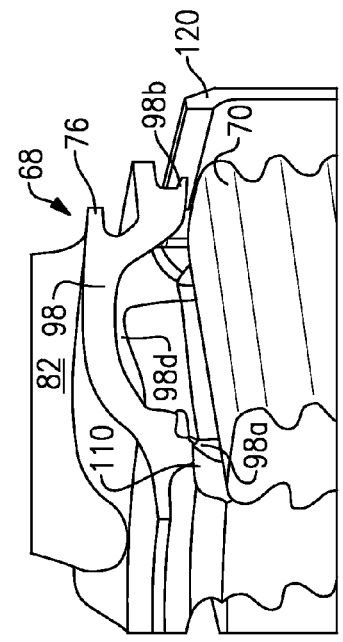
FIG. 7E is a perspective view of FIG. 7D.

Then, a cover plate 120 is installed as shown in FIGS. 7D-E. The disk 70 and shelf 94 support the damper seal 98 radially as shown in FIG. 7D. The cover plate 120 supports the damper seal axially and seals off the back of the blades. The leading edge tab 110 additionally serves to decrease damper rotation during assembly as shown in FIG. 7E.

As discussed above, the damper seal mass was increased to improve damper durability and retention. A top view of a blade 68, platform 96, and damper seal 98 is shown in FIG. 8. A plurality of cross-sections have been taken along the length of the damper seal 98 as indicated by sections 9A-9D in FIG. 8. The sections at these axial locations show the variance in mass distribution in the pocket 86 for the loads that are shared by adjacent platforms 76.

As shown in FIG. 9A, a first platform 76*a* is separated from an adjacent second platform 76*b* by the gap 84. A pressure side/leading edge pocket section is shown at 121 and a suction side/leading edge is shown at 122. At the leading edge of the blade 68 (9A-9A cross-sectional location), the majority of the mass of the damper seal 98 is located in the pressure side/leading edge pocket section 121, while only a small portion of the mass is located in the suction side/leading edge pocket section 122. Thus, the load carried by the first platform 76*a* is significantly greater at this location than the load carried by the second platform 76*b*.

FIG. 9B shows a cross-section location that is just aft of the leading edge of the blade. The mass distribution is similar to that of FIG. 9A, however, the second platform 76*b* carries a slightly greater load than that shown in FIG. 9B.

FIG. 9C shows a cross-section location that is aft of 9B and which is just forward of the trailing edge of the blade 68. At this location, the mass distribution has shifted as compared to that shown in FIG. 9A. The majority of the mass of the damper seal 98 at this axial location is located in the suction side pocket portion as indicated at 130, while only a lesser extent of the mass is located in the pressure side pocket section as indicated at 132. Thus, the load carried by the second platform 76*b* is significantly greater at this location than the load carried by the first platform 76*a*.

FIG. 9D shows a cross-section that is located at the trailing edge of the blade. At this location the mass distribution is generally centered within the pocket 86. Thus, the loads between the first 76*a* and second 76*b* platforms are generally equal at the trailing edge.

Figure 10:
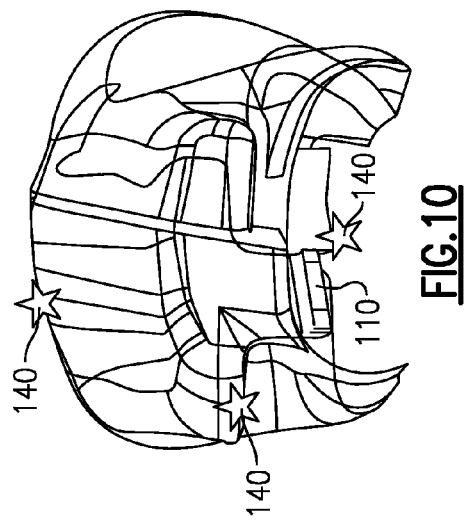
FIG. 10 is an end view showing tangential rotation restriction in one direction.
Figure 11:
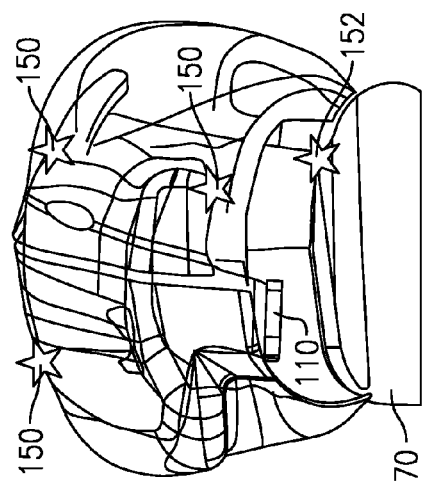
FIG. 11 is a view similar to FIG. 10 but showing tangential rotation restriction in an opposite direction.

FIGS. 10 and 11 show two examples of how added damper mass decreases rotational freedom of the damper seal 98 within the pocket 86. As shown in FIG. 10, the damper seal is limited from rotating in a counter-clockwise direction due to the interference between the damper seal and pocket as indicated at 140. In one example, the interference points limit the damper seal to six degrees or less of relative rotation. As shown in FIG. 11, the damper seal is limited from rotating in a clockwise direction due to the interference between the damper seal and pocket as indicated at 150, and between the damper seal and disk as indicated at 152.

The blade pocket shelf 94 holds the damper seal 98 radially, axially, and tangentially during engine operation and assembly. The damper seal slides in between the shelf on the pressure side of the blade pocket and the blade leading edge, which prevents the damper seal from sliding excessively in the axial direction. The damper seal also fills the blade pocket to the neck of the blade and down to the shelf 94, which prevents any excessive tangential rotation. The damper seal also seats onto the shelf 94, which prevents radial drop into the disk 70.

The assembly process for the damper seal is also significantly improved compared to prior configurations. At assembly, the added damper features, such as the leading edge tab for example, add mistake proofing to ensure that the damper seal is installed correctly. The damper seal is also configured to prevent the damper seals from becoming disengaged during assembly. Further, the added damper mass helps prevent the damper seal from rotating too far into the pressure side blade pocket.

Although an example embodiment has been disclosed, a worker of ordinary skill in this art would recognize that certain modifications would come within the scope of the claims. For that reason, the following claims should be studied to determine their true scope and content.

What is claimed is:

1. A damper seal for a gas turbine engine rotor assembly comprising:
   an axially elongated body having a leading edge, a trailing edge, a pressure side, and a suction side, and wherein the elongated body includes a first enlarged portion formed on the pressure side at the leading edge and a second enlarged portion formed on the suction side adjacent the trailing edge, and wherein the elongated body is defined by a width extending between the pressure and suction sides, and wherein the width is greater at a leading edge end than a trailing edge end of the elongated body.

2. The damper seal according to claim 1, wherein the elongated body is defined by a length extending between the leading and trailing edges, and wherein the width continuously varies between the leading edge and trailing edge, and wherein the width is at a maximum at the first enlarged portion.

3. The damper seal according to claim 1, wherein the first and second enlarged portions comprise increased mass portions relative to a remaining portion of the elongated body.

4. The damper seal according to claim 3, wherein the first enlarged portion has a greater mass than the second enlarged portion.

5. The damper seal according to claim 1, wherein the elongated body includes a tab that extends axially outward from the leading edge.

6. The damper seal according to claim 5, wherein the tab defines a minimum width for the elongated body.

7. A disk and blade assembly for a gas turbine engine comprising:
a disk defining an axis of rotation;
a plurality of blades mounted to the disk for rotation with the disk about the axis of rotation, each of the blades including an airfoil extending from a leading edge to a trailing edge and a platform having an inner surface and an outer surface, and wherein adjacent platforms define a pocket having a pressure side and a suction side that extend from the leading edge to the trailing edge; and
a damper seal mounted within the pocket such that a distribution of damper mass between the pressure side and suction side of the pocket is varied along an axial length of the damper seal, an axially elongated body having a leading edge, a trailing edge, a pressure side, and a suction side, and wherein the elongated body includes a first enlarged portion formed on the pressure side at the leading edge and a second enlarged portion formed on the suction side adjacent the trailing edge, and wherein the elongated body is defined by a width extending between the pressure and suction sides, and wherein the width is greater at a leading edge end than a trailing edge end of the axially elongated body.

8. The disk and blade assembly for the gas turbine engine according to claim 7, wherein the elongated body includes a first section portion that is generally radially aligned with the leading edge of the blade, and wherein a majority of the first section portion is positioned within the pressure side of the pocket.

9. The disk and blade assembly for the gas turbine engine according to claim 8, wherein 51% to 80% of the first section portion is positioned within the pressure side of the pocket.

10. The disk and blade assembly for the gas turbine engine according to claim 8, wherein the elongated body includes a second section portion that is generally radially aligned with the trailing edge of the blade, and wherein the second section portion has generally equal amounts within the pressure and suction sides of the pocket.

11. The disk and blade assembly for the gas turbine engine according to claim 10, wherein the elongated body includes a third section portion that is generally radially aligned with a portion of the blade that is closer to the trailing edge than the leading edge, and wherein a majority of the third section portion is positioned within the suction side of the pocket.

12. The disk and blade assembly for the gas turbine engine according to claim 8, wherein the elongated body includes a third section portion that is generally radially aligned with a portion of the blade that is closer to the trailing edge than the leading edge, and wherein a majority of the third section portion is positioned within the suction side of the pocket.

13. The disk and blade assembly for the gas turbine engine according to claim 8, wherein the first enlarged portion defines a maximum width of the elongated body.

14. The disk and blade assembly for the gas turbine engine according to claim 13, wherein the elongated body includes a tab that extends axially outward from the leading edge.

15. A disk and blade assembly for a gas turbine engine comprising:
a disk defining an axis of rotation;
a plurality of blades mounted to the disk for rotation with the disk about the axis of rotation, each of the blades including an airfoil extending from a leading edge to a trailing edge and a platform having an inner surface and an outer surface, and wherein adjacent platforms define a pocket having a pressure side and a suction side that extend from the leading edge to the trailing edge;
a damper seal mounted within the pocket such that a distribution of damper mass between the pressure side and suction side of the pocket is varied along an axial length of the damper seal, and wherein the damper seal comprises an axially elongated body having a leading edge, a trailing edge, a pressure side, and a suction side, and wherein the elongated body includes a first section portion that is generally radially aligned with the leading edge of the blade, and wherein a majority of the first section portion is positioned within the pressure side of the pocket;
wherein the elongated body includes a first enlarged portion formed on the pressure side at the leading edge and a second enlarged portion formed on the suction side adjacent the trailing edge, and wherein the first enlarged portion defines a maximum width of the elongated body; and
wherein the elongated body includes a tab that extends axially outward from the leading edge, and wherein the tab defines a minimum width for the elongated body and wherein a width is greater at a leading edge end than a trailing edge end of the elongated body.

16. The disk and blade assembly for the gas turbine engine according to claim 15, wherein the pocket has a radially outer wall, a pressure side wall, and a suction side wall, and wherein the pocket includes a leading edge wall portion and a trailing edge wall portion, and including a shelf extending in a tangential direction from the pressure side of the pocket, the shelf being positioned adjacent the leading edge wall portion and spaced apart from the radially outer wall, and wherein the damper seal is supported by the shelf.

17. The disk and blade assembly for the gas turbine engine according to claim 16, wherein the first enlarged portion has an overlapping relationship with the shelf.

18. The disk and blade assembly for the gas turbine engine according to claim 17, wherein the shelf comprises a first shelf and including a second shelf extending axially inward from the leading edge wall portion on the suction side of the pocket, and wherein the first and second shelves are configured to restrict radial, axial, and tangential movement of the damper seal within the pocket.

19. The disk and blade assembly for the gas turbine engine according to claim 15, wherein the tab is visible from a leading edge end face of the disk when assembled within the pocket.

20. The disk and blade assembly for the gas turbine engine according to claim 15, wherein the shelf is spaced from the leading edge wall portion by a gap, and wherein the leading edge of the elongated body is positioned within the gap.

* * * * *